US011659552B2

(12) United States Patent
Wu et al.

(10) Patent No.: US 11,659,552 B2
(45) Date of Patent: May 23, 2023

(54) TIME DIVISION DUPLEX (TDD) SLOT FORMAT CONFIGURATION INDICATION FOR SIDELINK COMMUNICATIONS

(71) Applicant: QUALCOMM INCORPORATED, San Diego, CA (US)

(72) Inventors: Shuanshuan Wu, San Diego, CA (US); Sudhir Kumar Baghel, Hillsborough, NJ (US); Kapil Gulati, Montgomery, NJ (US); Gabi Sarkis, San Diego, CA (US); Tien Viet Nguyen, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 16/948,557

(22) Filed: Sep. 23, 2020

(65) Prior Publication Data
US 2021/0099988 A1    Apr. 1, 2021

Related U.S. Application Data

(60) Provisional application No. 62/907,497, filed on Sep. 27, 2019.

(51) Int. Cl.
*H04W 72/04* (2009.01)
*H04L 5/14* (2006.01)
(Continued)

(52) U.S. Cl.
CPC ......... *H04W 72/0406* (2013.01); *H04L 5/143* (2013.01); *H04L 5/1469* (2013.01);
(Continued)

(58) Field of Classification Search
CPC ... H04L 5/0007; H04L 5/0048; H04L 5/0055; H04L 5/0058; H04L 5/0078;
(Continued)

(56) References Cited

U.S. PATENT DOCUMENTS 9,591,665 B2 * 3/2017 Kim ..................... H04L 7/0041
9,781,755 B2 * 10/2017 Lu ..................... H04W 72/0413
(Continued)

FOREIGN PATENT DOCUMENTS

AU    2018203813 A1 *   6/2018    ............... H04L 5/14
AU    2015256701 B2 *   8/2018    ........ H04W 72/0406
(Continued)

OTHER PUBLICATIONS

International Search Report and Written Opinion—PCT/US2020/052353—ISA/EPO—dated Dec. 14, 2020.
(Continued)

*Primary Examiner* — Eric Nowlin
(74) *Attorney, Agent, or Firm* — Haynes and Boone, LLP

(57) ABSTRACT

Wireless communications systems and methods related to sidelink communications in a TDD system are provided. A first user equipment (UE) may receive from a base station (BS), a time-division-duplexing (TDD) configuration. The first UE may select a first TDD configuration from a set of configured TDD configurations based on the TDD configuration. Additionally, the first UE may transmit to a second UE, an indication of the first TDD configuration. The first and the second UEs may communicate a sidelink communication based on the first TDD configuration. Other features are also claimed and described.

24 Claims, 10 Drawing Sheets

(51) Int. Cl.
  *H04W 72/02* (2009.01)
  *H04W 92/18* (2009.01)
  *H04W 72/0446* (2023.01)

(52) U.S. Cl.
  CPC ......... *H04W 72/02* (2013.01); *H04W 72/042* (2013.01); *H04W 72/0446* (2013.01); *H04W 92/18* (2013.01)

(58) Field of Classification Search
  CPC ..... H04L 5/0091; H04L 5/143; H04L 5/1469; H04W 72/02; H04W 72/0406; H04W 72/042; H04W 72/0446; H04W 76/14; H04W 92/18
  See application file for complete search history.

(56) References Cited

U.S. PATENT DOCUMENTS

| | | | |
|---|---|---|---|
| 9,974,102 B2 * | 5/2018 | Takano | H04W 72/042 |
| 10,028,314 B2 * | 7/2018 | Lu | H04W 72/0413 |
| 10,219,260 B2 * | 2/2019 | Ji | H04L 5/1469 |
| 10,674,554 B2 * | 6/2020 | Takano | H04L 5/14 |
| 11,191,074 B2 * | 11/2021 | Choi | H04W 72/042 |
| 11,272,502 B2 * | 3/2022 | Choi | H04L 5/14 |
| 11,388,717 B2 * | 7/2022 | Ko | H04W 4/40 |
| 2014/0341092 A1 * | 11/2014 | Chu | H04L 5/1469 370/280 |
| 2016/0020891 A1 * | 1/2016 | Jung | H04L 5/1469 370/280 |
| 2016/0219634 A1 * | 7/2016 | Lu | H04W 72/0453 |
| 2016/0353499 A1 * | 12/2016 | Takano | H04W 76/14 |
| 2017/0367138 A1 * | 12/2017 | Lu | H04W 72/0453 |
| 2018/0249523 A1 * | 8/2018 | Takano | H04W 76/14 |
| 2020/0037306 A1 * | 1/2020 | Seo | H04W 52/36 |
| 2020/0045697 A1 * | 2/2020 | Choi | H04W 72/042 |
| 2020/0077391 A1 * | 3/2020 | Choi | H04W 72/042 |
| 2020/0280981 A1 * | 9/2020 | Shin | H04L 5/14 |
| 2021/0037513 A1 * | 2/2021 | Wu | H04W 76/14 |
| 2021/0058905 A1 * | 2/2021 | Ganesan | H04L 5/0014 |
| 2021/0176735 A1 * | 6/2021 | Deng | H04W 72/02 |
| 2021/0195604 A1 * | 6/2021 | Yasukawa | H04W 72/085 |
| 2022/0046605 A1 * | 2/2022 | Ohara | H04L 5/14 |
| 2022/0086836 A1 * | 3/2022 | Ko | H04W 4/40 |
| 2022/0123915 A1 * | 4/2022 | Yoshioka | H04W 72/0406 |
| 2022/0191862 A1 * | 6/2022 | Hwang | H04L 5/14 |
| 2022/0216977 A1 * | 7/2022 | Hwang | H04L 5/0048 |
| 2022/0286265 A1 * | 9/2022 | Zhao | H04W 28/26 |

FOREIGN PATENT DOCUMENTS

| | | | | |
|---|---|---|---|---|
| AU | 2019446203 A1 * | 12/2021 | | H04L 27/26025 |
| BR | 112021002132 A2 * | 5/2021 | | H04L 5/0055 |
| CN | 105009499 A * | 10/2015 | | H04B 7/2643 |
| CN | 105981464 A * | 9/2016 | | H04L 5/14 |
| CN | 110582113 A * | 12/2019 | | H04W 56/0055 |
| CN | 110809322 A * | 2/2020 | | H04L 5/14 |
| CN | 111245585 A * | 6/2020 | | |
| CN | 111356237 A * | 6/2020 | | |
| CN | 105981464 B * | 10/2020 | | H04L 5/14 |
| CN | 112567836 A * | 3/2021 | | H04B 17/318 |
| CN | 112740785 A * | 4/2021 | | H04L 5/14 |
| CN | 113498192 A * | 10/2021 | | |
| CN | 110582113 B * | 2/2022 | | H04W 56/0055 |
| CN | 114128384 A * | 3/2022 | | H04L 5/14 |
| CN | 114208336 A * | 3/2022 | | H04L 5/0053 |
| CN | 114503752 A * | 5/2022 | | H04L 5/0048 |
| EP | 2932638 A1 | 10/2015 | | |
| EP | 2987376 A1 | 2/2016 | | |
| EP | 3407657 A1 * | 11/2018 | | H04W 16/14 |
| EP | 3582578 A1 * | 12/2019 | | H04B 7/0452 |
| EP | 3609267 A1 * | 2/2020 | | H04L 5/14 |
| EP | 3618546 A1 * | 3/2020 | | H04W 4/40 |
| EP | 3826400 A1 * | 5/2021 | | H04L 5/0055 |
| EP | 3860253 A1 * | 8/2021 | | H04L 5/14 |
| EP | 3927011 A1 * | 12/2021 | | H04L 5/14 |
| EP | 3962212 A1 * | 3/2022 | | H04L 5/14 |
| EP | 3582578 B1 * | 5/2022 | | H04B 7/0452 |
| EP | 4021118 A1 * | 6/2022 | | H04L 5/0048 |
| EP | 4021137 A1 * | 6/2022 | | H04B 7/0452 |
| ES | 2802375 T3 * | 1/2021 | | H04L 5/14 |
| JP | 2017518005 A * | 4/2015 | | |
| JP | 6302136 B2 * | 3/2018 | | H04W 72/0406 |
| JP | WO2020065896 A1 * | 9/2018 | | |
| JP | 2021533663 A * | 12/2021 | | H04L 5/14 |
| KR | 20160148011 A * | 4/2015 | | |
| KR | 20210039456 A * | 4/2021 | | H04W 72/0406 |
| KR | 20210145847 A * | 12/2021 | | H04L 5/14 |
| KR | 20220052332 A * | 4/2022 | | H04W 72/0406 |
| KR | 20220066360 A * | 5/2022 | | |
| RU | 2654165 C1 * | 5/2018 | | H04W 72/0406 |
| WO | WO-2014110764 A1 * | 7/2014 | | H04B 7/2612 |
| WO | WO-2014113095 A1 * | 7/2014 | | H04B 7/0417 |
| WO | WO-2015171048 A1 * | 11/2015 | | H04W 72/0406 |
| WO | WO-2016017100 A1 * | 2/2016 | | H04L 5/14 |
| WO | WO-2020029692 A1 * | 2/2020 | | H04L 5/0055 |
| WO | WO-2020032203 A1 * | 2/2020 | | |
| WO | WO-2020032704 A1 * | 2/2020 | | H04W 56/00 |
| WO | WO-2020033513 A1 * | 2/2020 | | H04B 17/318 |
| WO | WO-2020060463 A1 * | 3/2020 | | H04W 74/0841 |
| WO | WO-2020065896 A1 * | 4/2020 | | H04L 5/14 |
| WO | WO-2020180098 A1 * | 9/2020 | | H04L 5/14 |
| WO | WO-2021159532 A1 * | 8/2021 | | |
| WO | WO-2021162306 A1 * | 8/2021 | | H04L 5/0048 |
| WO | WO-2021162356 A1 * | 8/2021 | | H04L 5/14 |
| WO | WO-2021205664 A1 * | 10/2021 | | |
| WO | WO-2021206505 A1 * | 10/2021 | | |
| WO | WO-2022031147 A1 * | 2/2022 | | |
| WO | WO-2022039469 A1 * | 2/2022 | | |

OTHER PUBLICATIONS

Qualcomm Incorporated: "Synchronization Design for NR V2X", 3GPP Draft, 3GPP TSG RAN WG1 Meeting #98, R1-1909255_Synchronization for NR V2X, 3rd Generation-Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 16, 2019 (Aug. 16, 2019), XP051765860, 15 Pages, Retrieved from the Internet: URL:http://www.3gpp.org/ftp/tsg_ran/WG1_RL1/TSGR1_98/Docs/R1-1909255.zip [retrieved on Aug. 16, 2019] Paragraph [02.3].

Sharp: "Considerations on Synchronization Design for NR V2X", 3GPP Draft, 3GPP TSG RAN WG1 Ad-Hoc Meeting 1901, R1-1900832, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan 25, 2019, Jan. 20, 2019 (Jan. 20, 2019), XP051593678, 4 pages, Retrieved from the Internet: URL: http://www.3gpp.org/ftp/Meetings%5F3GPP%5FSYNC/RAN1/Docs/R1%2D1900832%2Ezip [retrieved on Jan. 20, 2019] Paragraph "2.4 PSBCH contents".

* cited by examiner

| TDD Configuration Index | TDD Configuration Periodicity | # of UL slots indication |
|---|---|---|
| 0 | 2 ms | 2 |
| 1 | 2 ms | 4 |
| 2 | 5 ms | 2 |
| 3 | 5 ms | 4 |
| 4 | 5 ms | 8 |
| 5 | 10 ms | 2 |
| 6 | 10 ms | 4 |
| 7 | 10 ms | 8 |
| 8 | 10 ms | 16 |
| ... | ... | ... |

FIG. 7

TIME DIVISION DUPLEX (TDD) SLOT FORMAT CONFIGURATION INDICATION FOR SIDELINK COMMUNICATIONS

CROSS REFERENCE TO RELATED APPLICATIONS & PRIORITY CLAIM

The present application claims priority to and the benefit of U.S. Provisional Patent Application No. 62/907,497 filed Sep. 27, 2019, which is hereby incorporated by reference in its entirety as if fully set forth below and for all applicable purposes.

TECHNICAL FIELD

This application relates to wireless communication systems, and more particularly to communicating an indication of a time division duplex (TDD) for sidelink communications. Aspects may provide solutions and techniques for reducing signaling overhead and improving resource utilization efficiency.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In a wireless communication network, a BS may communicate with a UE in an uplink direction and a downlink direction. Earlier forms of sidelink were introduced in LTE to allow a UE to send data to another UE without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

Aspects of the present disclosure provide mechanisms for identifying a sidelink time-division-duplexing (TDD) configuration for use in sidelink communications. Sidelink communications allow a user equipment (UE) to communicate with another UE without tunneling through a base station (BS) and/or the core network. An in-coverage UE may be within a coverage area of a BS and thus may be in communication with the BS. The in-coverage sidelink UE may be preconfigured with a set of sidelink TDD configurations, may receive a BS TDD configuration from a serving BS, and may select a sidelink TDD configuration from the set of sidelink TDD configurations to match the BS TDD configuration. Additionally, the in-coverage sidelink UE may transmit an indication of the selected sidelink TDD configuration to a second UE. Accordingly, rather than transmit the selected sidelink TDD configuration in its entirety to the second UE, the first UE transmits an indication of the selected sidelink TDD configuration. In some aspects, a first UE may broadcast a sidelink TDD configuration indication. A second UE may receive the sidelink TDD configuration indication and identify, based on the sidelink TDD configuration indication, a sidelink TDD configuration from a preconfigured set of sidelink TDD configurations. The first UE and the second UE may communicate a sidelink communication based on the sidelink TDD configuration. The phrases "TDD configuration" and "sidelink TDD configuration" may be used interchangeably in the present disclosure. Additionally, the phrases "set of sidelink TDD configurations" and "set of configured TDD configurations" may be used interchangeably in the present disclosure.

In an aspect of the disclosure, a method of wireless communication includes receiving, by a first UE from a BS, a TDD configuration; selecting, by the first UE, a first TDD configuration from a set of configured TDD configurations based on the TDD configuration; transmitting, by the first UE to a second UE, an indication of the first TDD configuration; and communicating, by the first UE, a sidelink communication based on the first TDD configuration.

In an aspect of the disclosure, a method of wireless communication includes receiving, by a first UE from a second UE, a TDD configuration indication; identifying, by the first UE, a first TDD configuration from a set of configured TDD configurations based on the TDD configuration indication; and communicating, by the first UE, a sidelink communication based on the first TDD configuration.

In an aspect of the disclosure, an apparatus of wireless communication includes a transceiver configured to: receive, by a first UE from a BS, a TDD configuration; transmit, by the first UE to a second UE, an indication of a first TDD configuration; and communicate, by the first UE, a sidelink communication based on the first TDD configuration. The apparatus also includes a processor configured to select, by the first UE, the first TDD configuration from a set of configured TDD configurations based on the TDD configuration.

In an aspect of the disclosure, an apparatus of wireless communication includes a transceiver configured to: receive, by a first UE from a second UE, a TDD configuration indication; and communicate, by the first UE, a sidelink communication based on a first TDD configuration. The apparatus also includes a processor configured to identify, by the first UE, the first TDD configuration from a set of configured TDD configurations based on the TDD configuration indication.

In an additional aspect of the disclosure, a computer-readable medium having program code recorded thereon, the program code includes code for causing a first UE to receive from a BS, a TDD configuration; code for causing the first UE to select a first TDD configuration from a set of configured TDD configurations based on the TDD configuration; code for causing the first UE to transmit to a second UE, an indication of the first TDD configuration; and code for causing the first UE to communicate a sidelink communication based on the first TDD configuration.

In an additional aspect of the disclosure, a computer-readable medium having program code recorded thereon, the program code includes code for causing a first UE to receive from a second UE, a TDD configuration indication; code for causing the first UE to identify a first TDD configuration from a set of configured TDD configurations based on the TDD configuration indication; and code for causing the first UE to communicate with the second UE, a sidelink communication based on the first TDD configuration.

In an additional aspect of the disclosure, an apparatus includes means for receiving from a BS, a TDD configuration; means for selecting a first TDD configuration from a set of configured TDD configurations based on the TDD configuration; means for transmitting to a second UE, an indication of the first TDD configuration; and means for communicating with the second UE, a sidelink communication based on the first TDD configuration.

In an additional aspect of the disclosure, an apparatus includes means for receiving from a second UE, a TDD configuration indication; means for identifying a first TDD configuration from a set of configured TDD configurations based on the TDD configuration indication; and means for communicating with the second UE, a sidelink communication based on the first TDD configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is an index table according to some aspects of the present disclosure.

DETAILED DESCRIPTION

Figure 1:
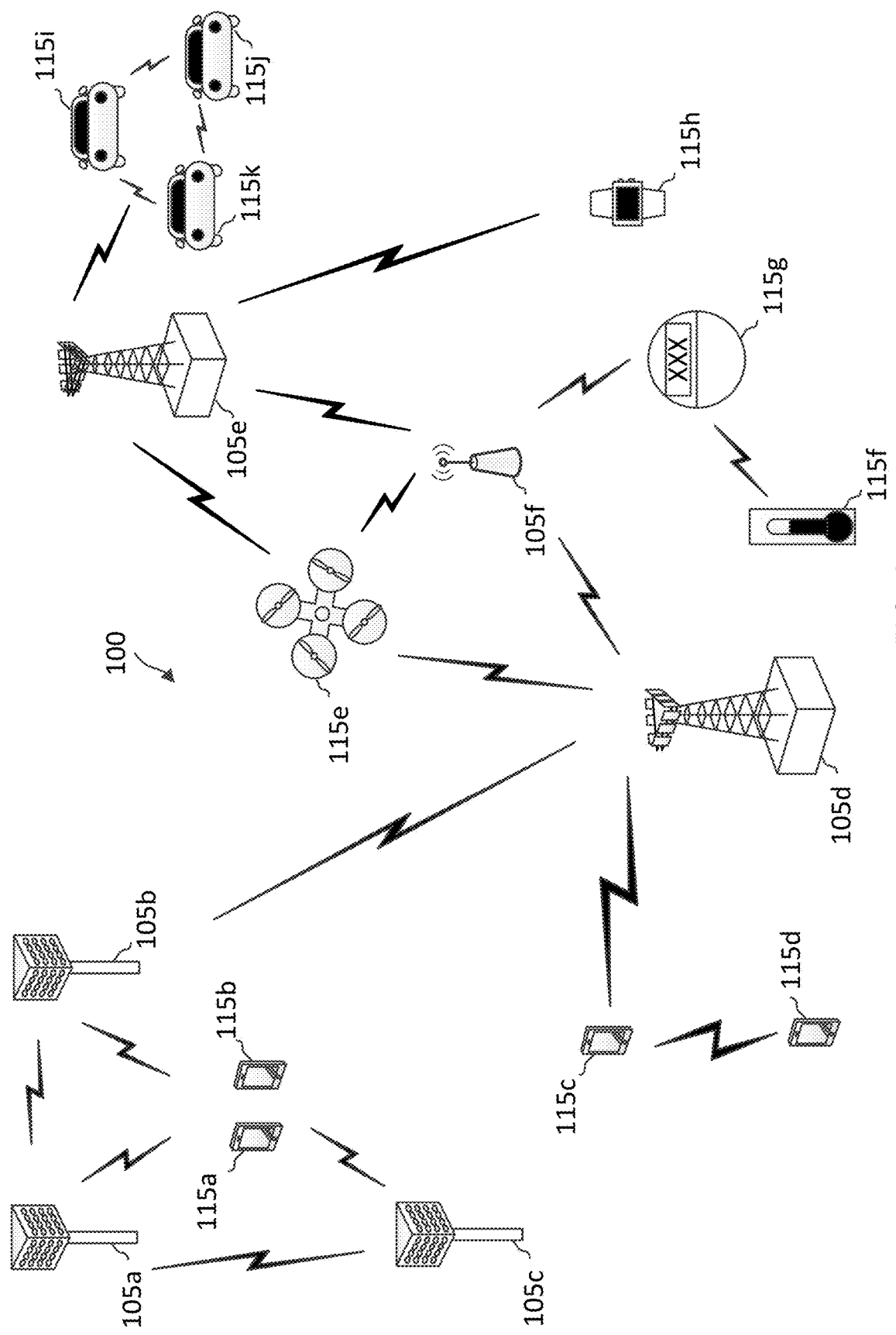
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for identifying a sidelink time-division-duplexing (TDD) configuration for use in sidelink communications. Sidelink communications allow a user equipment (UE) to communicate with another UE without tunneling through a base station (BS) and/or the core network. An in-coverage UE may be within a coverage area of a BS and thus may be in communication with the BS. The in-coverage sidelink UE may be preconfigured with a set of sidelink TDD configurations, may receive a BS TDD configuration from a serving BS, and may select a sidelink TDD configuration from the set of sidelink TDD configurations to match the BS TDD configuration. Additionally, the in-coverage sidelink UE may transmit an indication of the selected sidelink TDD configuration to a second UE. Accordingly, rather than transmit the selected sidelink TDD configuration in its entirety to the second UE, the first UE transmits an indication of the selected sidelink TDD configuration. In some aspects, a first UE may broadcast a TDD configuration indication. A second UE may receive the TDD configuration indication and identify, based on the TDD configuration indication, a TDD configuration from a preconfigured set of TDD configurations. The first UE and the second UE may communicate a sidelink communication based on the TDD configuration. In some aspects, the first UE may communicate a sidelink communication by transmitting a sidelink communication to the second UE. In some aspects, the first UE may communicate a sidelink communication by receiving a sidelink communication from the second UE.

Aspects of the present disclosure can provide several benefits. For example, if a BS transmits communications in accordance with a TDD configuration, it may be desirable for a first UE to use the UL slots and/or the flexible slots specified in the TDD configuration for sidelink communications in order to avoid interference with the BS. The first UE may communicate a sidelink communication with a second UE. To avoid interference with the BS, it may be desirable for the second UE to know the first UE's TDD configuration and to transmit sidelink communications using the UL slots and/or the flexible slots specified in the first UE's TDD configuration. Additionally, rather than transmit an entire TDD configuration to a UE, the present disclosure may provide solutions and techniques for reducing signaling overhead and improving resource utilization efficiency by transmitting an indication of the TDD configuration.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105.

Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may provision for sidelink communications to allow a UE 115 to communicate with another UE 115 without tunneling through a BS 105 and/or the core network. For instance, the network 100 may operate over a TDD spectrum, where UL transmissions and DL transmissions may occur at different time periods. A sidelink may use the spectrum during at least some of the UL periods (e.g., a portion of the UL resources) for sidelink communications. A resource that can be used for sidelink communications may also be referred to as a sidelink resource. The BS 105 may configure certain resources in a licensed band and/or an unlicensed band for communications, and the UE 115 and another UE 115 may communicate sidelink communications using the sidelink resources.

Figure 2:
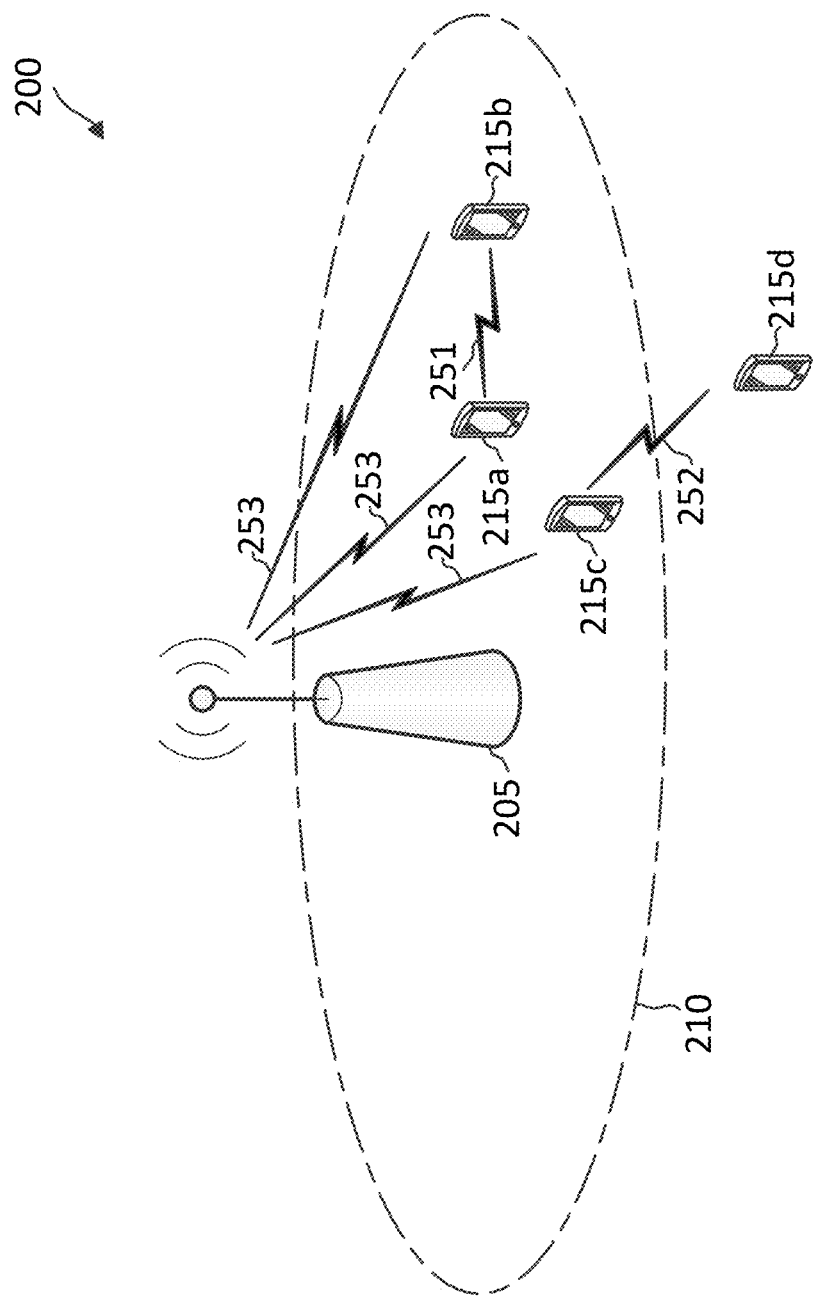
FIG. 2 illustrates a wireless communication network that provisions for sidelink communications according to some aspects of the present disclosure.

FIG. 2 illustrates an example of a wireless communication network 200 that provisions for sidelink communications according to embodiments of the present disclosure. The network 200 may be similar to the network 100. FIG. 2 illustrates one BS 205 and four UEs 215 for purposes of simplicity of discussion, though it will be recognized that embodiments of the present disclosure may scale to any suitable number of UEs 215 and/or BSs 205 (e.g., about 2, 3, 6, 7, 8, or more). The BS 205 and the UEs 215 may be similar to the BSs 105 and the UEs 115, respectively. The BSs 205 and the UEs 215 may communicate over the same spectrum.

In the network 200, some of the UEs 215 may communicate with each other in peer-to-peer communications. For example, the UE 215a may communicate with the UE 215b over a sidelink 251, and the UE 215c may communicate with the UE 215d over another sidelink 252. The sidelinks 251 and 252 are unicast bidirectional links. In some other instances, the sidelinks 251 and 252 can be multicast links supporting multicast sidelink services. For instance, the UE 215c may transmit multicast data to the UE 215d and the UE 215b over sidelinks. Some of the UEs 215 may also communicate with the BS 205 in an UL direction and/or a DL direction via communication links 253. For instance, the UEs 215a, 215b, and 215c are within a coverage area 210 of the BS 205, and thus may be in communication with the BS 205. A UE that is within the coverage area of a BS may receive signals from the BS and may also be referred to as an in-coverage UE. The UE 215d is outside the coverage area 210, and thus may not be in direct communication with the BS 205. A UE that is outside the coverage area of a BS may not be able to receive signals from the BS and may also be referred to as an out-of-coverage UE. In some instances, the UE 215c may operate as a relay for the UE 215d to reach the BS 205. In some aspects, some of the UEs 215 are associated with vehicles (e.g., similar to the UEs 115*i-k*) and the communications over the sidelinks 251 and/or 252 may be C-V2X communications. C-V2X communications may refer to communications between vehicles and any other wireless communication devices in a cellular network. In some aspects, the network 200 may be a LTE network or an NR network.

The BS 205 and the UEs 215a, 215b, 215c, and 215d may receive or transmit communications in accordance with a TDD configuration. In some aspects, sidelink communications (e.g., V2X, D2D, or C-V2X) are deployed in a TDD system, and the sidelink may share the TDD spectrum and use the same frequency band as the DL and/or the UL in different timeslots. TDD refers to providing duplex communications links whereby DL communications signals are separated from UL communications signals by the allocation of different time slots in the same frequency band. A TDD configuration may specify one or more of the following parameters: a SCS, a periodicity (e.g., 0.5 ms, 0.625 ms, 1 ms, 1.25 ms, 2 ms, 2.5 ms, 5 ms, 10 ms), and/or a number of TDD patterns (e.g., 1 or 2). The periodicity of a TDD configuration indicates the duration of the TDD configuration, and the configuration may repeat periodically in accordance with the period. Additionally, each pattern may specify one or more of the following parameters: a number of UL slots, a number of UL symbols, a number of DL slots, a number of DL symbols, and/or a number of flexible slots. If a TDD configuration specifies two TDD patterns, each pattern may specify its own parameters (e.g., the number of UL slots and the number of DL slots). Each TDD configuration may specify an UL/DL slot format. In the present disclosure, a pattern that specifies a given parameter (e.g., number of UL slots) may also refer to the TDD configuration that specifies the pattern also specifying the given parameter. In some aspects, a first pattern may have a periodicity of 10 ms followed by a second pattern with a periodicity of 5 ms, resulting in a composite 15 ms periodicity.

Figure 3:
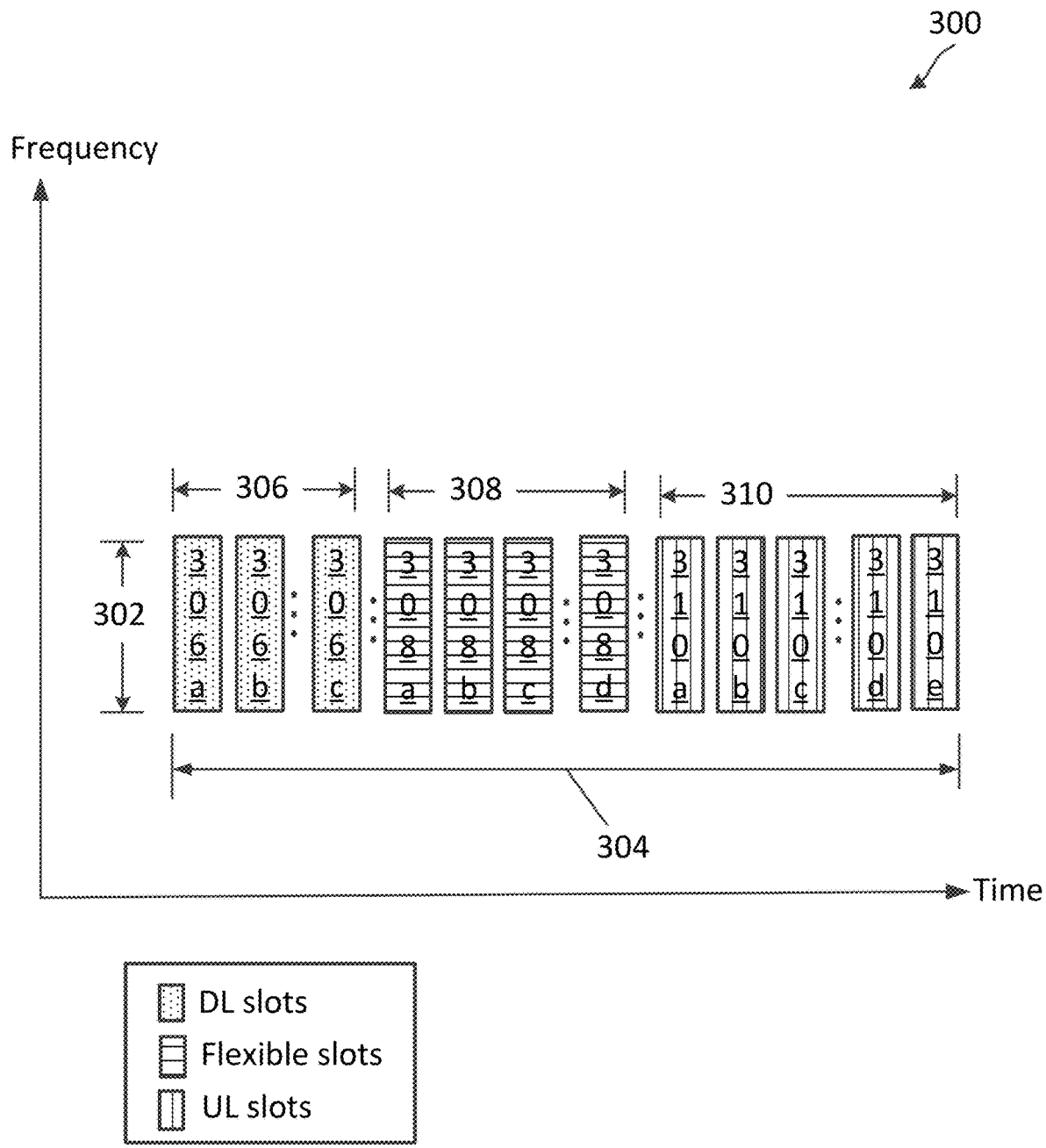
FIG. 3 illustrates a time-division-duplexing (TDD) configuration according to some aspects of the present disclosure.

FIG. 3 illustrates a TDD configuration 300 according to some aspects of the present disclosure. The TDD configuration 300 may be employed by BSs such as the BSs 105 and 205 and UEs such as the UEs 115 and 215 in a network such as the network 100 or network 200. In some instances, the network may be an NR network. In FIG. 3, the x-axis represents time in some arbitrary units, and the y-axis represents frequency in some arbitrary units.

A BS (e.g., the BSs 105 and/or 205) may configure a UE (e.g., the UEs 115 and/or 215) with resources 306, 308, and 310 in the frequency band 302 during a time period 304. The time period 304 may refer to the periodicity of a pattern specified in a TDD configuration. The resources 306 may be DL resources (e.g., DL slots), the resources 308 may be flexible slots, and the resources 310 may be UL resources (e.g., UL slots). A flexible slot may be used for UL or DL communications. The TDD configuration 300 may indicate a pool of resources (e.g., UL slots, DL slots, flexible slots) in a frequency band (e.g., the frequency band 302). In FIG. 3, the TDD configuration 300 may specify a periodicity of 10 ms and one TDD UL/DL pattern. The TDD configuration 300 may include 20 slots, which corresponds to a periodicity of 10 ms if the SCS is 30 kHz. Additionally, the TDD configuration 300 may specify a number of DL slots, a number of UL slots, and a number of flexible slots within the time period 304. The UEs may use the UL slots as resources for sidelink communications.

A TDD configuration may be a common TDD configuration or a flexible TDD configuration. In some aspects, a common TDD configuration may indicate a SCS and a first TDD UL/DL pattern. The common TDD configuration may also indicate a second pattern. The BS 205 may transmit a signal indicating the common TDD configuration in a SIB (e.g., SIB1), and the signal may indicate the periodicity of the TDD configuration, the number of DL slots, the number of DL symbols, the number of UL slots, and/or the number of UL symbols of the TDD configuration. The remaining symbols in the TDD frame may be flexible symbols.

In some aspects, the BS 205 may use UE-specific RRC signaling and may transmit a dedicated TDD configuration via a RRC configuration message. A dedicated TDD configuration may override flexible slots/symbols indicated by a common TDD configuration. In some instances, a common TDD configuration may specify a given slot as a flexible slot, and the dedicated TDD configuration may override the flexible slot designation and specify the given slot as an UL slot. In some instances, the dedicated TDD configuration may override a flexible slot designation and specify the flexible slot as a DL slot.

The BS and/or the UE may communicate in accordance with the TDD configuration 300. To reduce interference between the sidelink and the UL/DL communications, it may be desirable for the UEs to know the TDD configuration of a BS and to determine those resources (e.g., UL slots) that can be used for sidelink communications. In the TDD system, the UL resources may be referred to as UL slots. A UE may identify UL resources based on the UL/DL resources specified in the TDD configuration 300 and may accordingly use those UL resources to communicate (e.g., transmit and/or receive) sidelink communications. If the BS 205 transmits communications in accordance with the TDD configuration 300, it may be desirable for the in-coverage UEs 215a, 215bc, and 215c to use the UL slots and/or the flexible slots specified in the TDD configuration 300 for sidelink communications to avoid interference with the BS 205. Additionally, to avoid interference with the BS 205, it may be desirable for the out-of-coverage UE 215d to know the TDD configuration 300 of the BS 205 for sidelink communications with the UE 215a, 215bc, or 215c.

A BS may transmit communications in accordance with a TDD configuration of the BS. A UE may transmit communications in accordance with a TDD configuration of the UE. The BS's TDD configuration and the UE's TDD configuration may be different or the same. A TDD configuration of a TDD frame may be flexible and specify different parameters from other TDD configurations (e.g., different UL/DL sequences for different slots). A first TDD configuration may have a different SCS, a different number of patterns, a different periodicity, a different number of UL slots, a different number of UL symbols, a different number of DL slots, a different number of DL symbols, and/or a different number of flexible slots than a second TDD configuration. A different TDD configuration may be defined for each SCS of a plurality of SCS. Some examples of SCSs may include 15 kHz, 30 kHz, 60 kHz, and/or 120 kHz.

The TDD configuration overhead is large because of the large number of possibilities for defining parameters of the TDD configuration (e.g., the sequence of DL/flexible slots/ UL). Accordingly, the signaling overhead for conveying the TDD configuration in radio interface (Uu interface) is typically large. A TDD configuration that may be assumed for communicating sidelink communications may also be referred to as a sidelink TDD configuration. When UEs that communicate with each other on sidelink operate with the same TDD configuration (e.g., these UEs are in the coverage of same BS, or, all BSs may have same TDD configuration), the TDD configuration indicated by BS may be assumed for sidelink, i.e., the sidelink TDD configuration is the same as BS TDD configuration. The UEs may have access to a preconfigured set of UE sidelink TDD configurations. The preconfigured set of UE sidelink TDD configurations may include one or multiple TDD configurations, but may include fewer TDD configurations than can be specified by the Uu interface between UEs and various infrastructure nodes (e.g., BS 205). A TDD configuration may be preconfigured if the TDD configuration is specified in the 3GPP specifications, the TDD configuration is configured at the UE as part of a set of parameters for the UE to perform sidelink communications, and/or the BS configures the TDD configuration for a UE when the UE was within coverage of the BS. Additionally, a set of configured TDD configurations may refer to a preconfigured set of TDD configurations.

The present disclosure provides techniques for enabling a UE to determine the TDD configuration for use in sidelink communications, whether the UE is within coverage of a BS or outside the coverage of the BS. Additionally, the present application provides techniques for reducing the signaling overhead for determining and/or indicating a sidelink TDD configuration for sidelink communications. Additionally, the reduced overhead may allow for the UE to transmit an indication of the TDD configuration in sidelink broadcast channel, e.g., physical sidelink broadcast channel (PSBCH).

In some aspects, an in-coverage sidelink UE is preconfigured with a set of TDD configurations, receives a BS TDD configuration from a serving BS, selects a UE sidelink TDD configuration from the set of TDD configurations to match the BS 205's TDD configuration. The UE 215a that is within coverage of the BS 205 may communicate with the BS 205 and receive the BS 205'S TDD configuration. The BS 205 may transmit the TDD configuration 300 to the in-coverage UE 215a, 215b, or 215c. The BS 205 may transmit the TDD configuration 300 when the sidelink communication is over a licensed band or an unlicensed band. The UE 215a may compare the BS's TDD configuration and a set of UE sidelink TDD configurations. The set of UE sidelink TDD configurations may be predetermined or preconfigured. The UE 215a selects, based on the comparison, a UE sidelink TDD configuration from the set of UE sidelink TDD configurations. In some aspects, the selected UE sidelink TDD configuration may be the same as the BS's TDD configuration. In some aspects, a UE sidelink TDD configuration may be the same as the BS's TDD configuration if one or more of the following parameters specified in the TDD configurations is the same: SCS, TDD configuration periodicity, number of UL slots in the TDD configuration, number of UL symbols in the TDD configuration, number of flexible slots in the TDD configuration, number of flexible symbols in the TDD configuration, number of DL slots in the TDD configuration, or number of DL symbols in the TDD configuration.

In some aspects, the selected UE sidelink TDD configuration is the closest match to the BS's TDD configuration compared to the other UE sidelink TDD configurations included in the set. Although the UE sidelink TDD configuration selected and used by the UE for sidelink communications may not be the same as the BS's TDD configuration, the UE sidelink TDD configuration may be very close to the BS's TDD configuration and accordingly reduce interference with transmissions from the BS. The UE 215a's selection of the UE sidelink TDD configuration may be in accordance with a set of rules and is discussed further below. The UE 215a may transmit an indication of the selected UE sidelink TDD configuration to another UE 215b, 215c, or 215d for sidelink communications. The UE 215a and the other UE (e.g., UE 215b, 215c, or 215d) may communicate a sidelink communication based on the indicated UE sidelink TDD configuration.

In some aspects, the BS TDD configuration may be the common TDD configuration. The UE may select a TDD configuration from the set based only on the common TDD configuration. In some aspects, the BS TDD configuration is determined based on the common TDD configuration and dedicated TDD configuration. In some aspects, the BS TDD configuration is determined based on the common TDD configuration, dedicated TDD configuration, and physical layer TDD slot format indication.

In some aspects, a sidelink UE broadcasts a TDD configuration indication (e.g., index) via a sidelink broadcast channel (e.g., PSBCH) to another sidelink UE. The UE that receives the TDD configuration indication may be out-of-coverage or in-coverage of the same serving BS 205 or different serving BS. The UE 215d that is outside the coverage of the BS 205 may be unable to receive a TDD configuration directly from the BS 205. In some aspects, the UE 215d receives an indication of a sidelink TDD configuration from the UE 215a, where the indicated sidelink TDD configuration is used by the in-coverage UE 215a to communicate with another sidelink UE (e.g., UE 215d). The sidelink TDD configuration indication provides the UE 215d with information regarding the resource configuration used by the in-coverage UE 215a to avoid or mitigate any potential interference to sidelink communications from the UL or DL communications, and/or, avoid or mitigate any potential interference to UL or DL communications from sidelink communications. In some aspects, the indicated sidelink TDD configuration may be the UE sidelink TDD configuration that is selected by the UE 215a, as discussed above. The UE 215a and the UE 215d may each have access to a set of UE sidelink TDD configurations, which may be predetermined or preconfigured. Additionally, the set of UE sidelink TDD configurations may include the indicated sidelink TDD configuration. Based on the indication, the UE 215d may identify a sidelink TDD configuration from the set of UE sidelink TDD configurations, where the identified sidelink TDD configuration is the same as the indicated sidelink TDD configuration. The UE 215a and the UE 215d may communicate a sidelink communication based on the sidelink TDD configuration identified by the UE 215d. Accordingly, the UE 215a and the UE 215d have the same understanding of the sidelink TDD configuration for use in sidelink communications.

If the UE 215d is within coverage of the BS 205, the BS 205 may transmit the BS's TDD configuration to the UE 215d. Based on the BS's TDD configuration, the UE 215d may select a sidelink TDD configuration from the set of sidelink TDD configurations (as discussed above). Accordingly, the sidelink TDD configuration that is indicated by the UE 215a and is received by the UE 215d may be the same sidelink TDD configuration that would be selected by the UE 215d if the UE 215d were within coverage of the BS 205.

Figure 4:
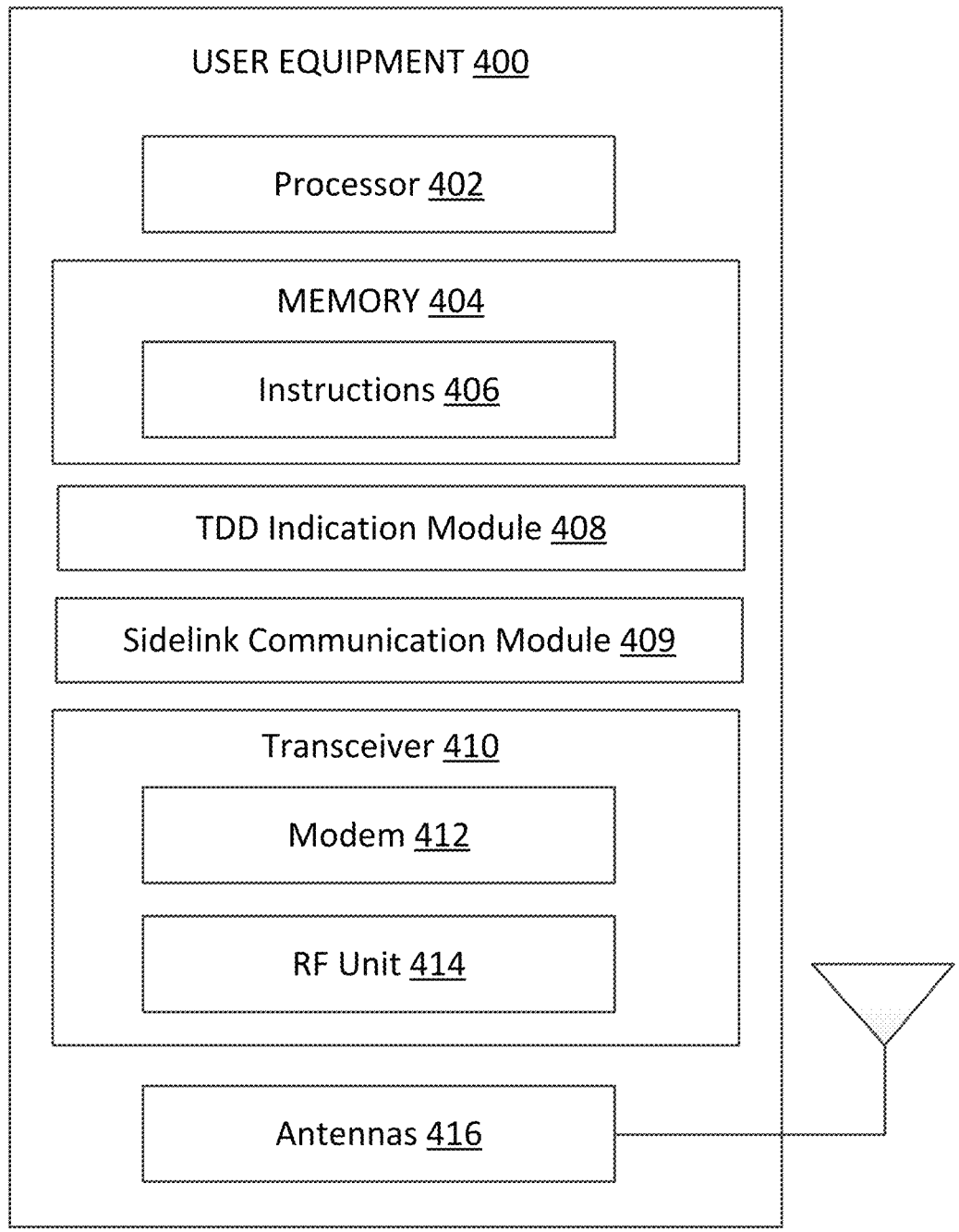
FIG. 4 is a block diagram of a user equipment (UE) according to some aspects of the present disclosure.

FIG. 4 is a block diagram of a UE 400 according to some aspects of the present disclosure. The UE 400 may be a UE 115 discussed above in FIG. 1 or a UE 215 discussed above in FIG. 2. As shown, the UE 400 may include a processor 402, a memory 404, a TDD indication module 408, a sidelink communication module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 6-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The TDD indication module 408 and/or the sidelink communication module 409 may be implemented via hardware, software, or combinations thereof. The TDD indication module 408 and/or the sidelink communication module 409 may be implemented as a processor, circuit, and/or instructions 406 stored in the memory 404 and executed by the processor 402. In some instances, the TDD indication module 408 and/or the sidelink communication module 409 can be integrated within the modem subsystem 412. The TDD indication module 408 and/or the sidelink communication module 409 can be implemented by a combination of software components (e.g., executed by a DSP or a general processor) and hardware components (e.g., logic gates and circuitry) within the modem subsystem 412. The TDD indication module 408 and/or the sidelink communication module 409 may be used for various aspects of the present disclosure, for example, aspects of FIGS. 1-3 and 6-10.

FIG. 4 will be discussed in relation to FIG. 2 to better understand some of the concepts disclosed in the present disclosure. In some aspects, the UE 400 corresponds to the UE 215a in FIG. 2 and is within coverage of the BS 205 in FIG. 2. Accordingly, the UE 400 may receive TDD configuration signaling from the BS 205. The TDD indication module 408 may be configured to receive from the BS, a TDD configuration of the BS (e.g., TDD configuration 300 in FIG. 3). The TDD indication module 408 may be configured to select a TDD configuration from a set of configured TDD configurations based on the BS's TDD configuration. A TDD configuration indication may also be referred to as a sidelink TDD configuration indication in the present disclosure. Additionally, a set of sidelink TDD configurations may also be referred to as a set of configured TDD configurations in the present disclosure. The selected TDD configuration may be the same as the BS's TDD configuration or may be the closest match to the BS's TDD configuration compared to the other TDD configurations in the set of configured TDD configurations. Mechanisms for selecting a TDD configuration from a set of configured TDD configurations are described in greater detail herein. The TDD indication module 408 may be configured to transmit to a second UE, an indication of the selected TDD configuration. The second UE may be within coverage of the BS or may be outside the coverage of the BS. Mechanisms for transmitting the indication of the selected TDD configuration are described in greater detail herein. The sidelink communication module 409 may be configured to communicate a sidelink communication based on the selected TDD configuration.

In some aspects, the UE 400 corresponds to the UE 215d in FIG. 2 and is outside the coverage of the BS 205 in FIG. 2. Accordingly, the UE 400 may be unable to receive TDD configuration signaling from the BS 205. The TDD indication module 408 may be configured to receive from a second UE, a TDD configuration indication. The second UE may be within coverage of the BS or may be outside the coverage of the BS. Rather than receive the BS 205's TDD configuration, the UE 400 may receive an indication of the TDD configuration that is used by the second UE for sidelink communications. The TDD indication module 408 may be configured to identify a TDD configuration from a set of configured TDD configurations based on the sidelink TDD configuration indication. The sidelink communication module 409 may be configured to communicate a sidelink communication based on the identified TDD configuration. Mechanisms for identifying a TDD configuration from a set of configured configurations based on an indication of a TDD configuration are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the sidelink communication module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSSCH data and/or PSCCH control information) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., the frequency interlace configuration, PSSCH data, and/or PSCCH control information) to the sidelink communication module 409 for processing. The antennas 416 may include multiple antennas of similar or different designs in order to sustain multiple transmission links. The RF unit 414 may configure the antennas 416.

In some aspects, the transceiver 410 is configured to receive a TDD configuration from a BS (e.g., the BSs 105 and 205), receive a TDD configuration from another UE, receive and/or transmit an indication of a sidelink TDD configuration, receive sidelink communications from another UE, transmit sidelink communications to another UE, by coordinating with the TDD indication module 408 and/or sidelink communication module 409.

In some aspects, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
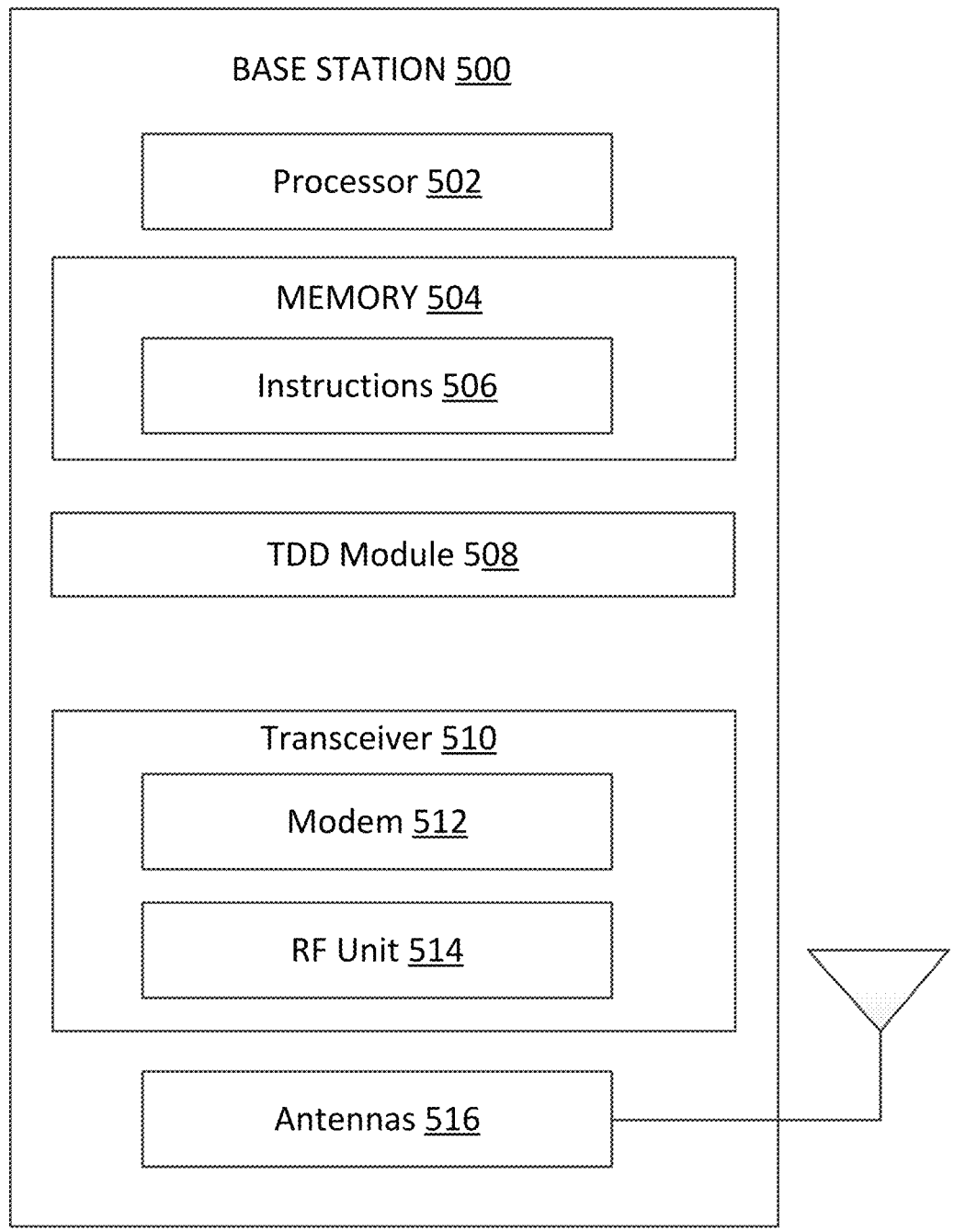
FIG. 5 is a block diagram of a base station (BS) according to some aspects of the present disclosure.

FIG. 5 is a block diagram of a BS 500 according to some aspects of the present disclosure. The BS 500 may be a BS 105 as discussed above in FIG. 1 or a BS 205 as discussed above in FIG. 2. As shown, the BS 500 may include a processor 502, a memory 504, a TDD module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-10. Instructions 506 may also be referred to as code, which may be interpreted broadly to include any type of computer-readable statement(s) as discussed above with respect to FIG. 4.

The TDD module 508 may be implemented via hardware, software, or combinations thereof. The TDD module 508 may be implemented as a processor, circuit, and/or instructions 506 stored in the memory 504 and executed by the processor 502. In some instances, the TDD module 508 can be integrated within the modem subsystem 512. The TDD module 508 can be implemented by a combination of software components (e.g., executed by a DSP or a general processor) and hardware components (e.g., logic gates and circuitry) within the modem subsystem 512.

The TDD module 508 may be used for various aspects of the present disclosure, for example, aspects of FIGS. 1-3 and 6-8. The TDD module 508 may be configured to transmit a TDD configuration of the BS 500 to one or more UEs. The TDD module 508 may also be configured to transmit an indication (e.g., index) of a TDD configuration of the BS 500 to one or more UEs.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., UCI, DMRS) to the sidelink communication module 508 for processing. The antennas 516 may include multiple antennas of similar or different designs in order to sustain multiple transmission links.

In an example, the transceiver 510 is configured to transmit a TDD configuration by coordinating with the TDD module 508. In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
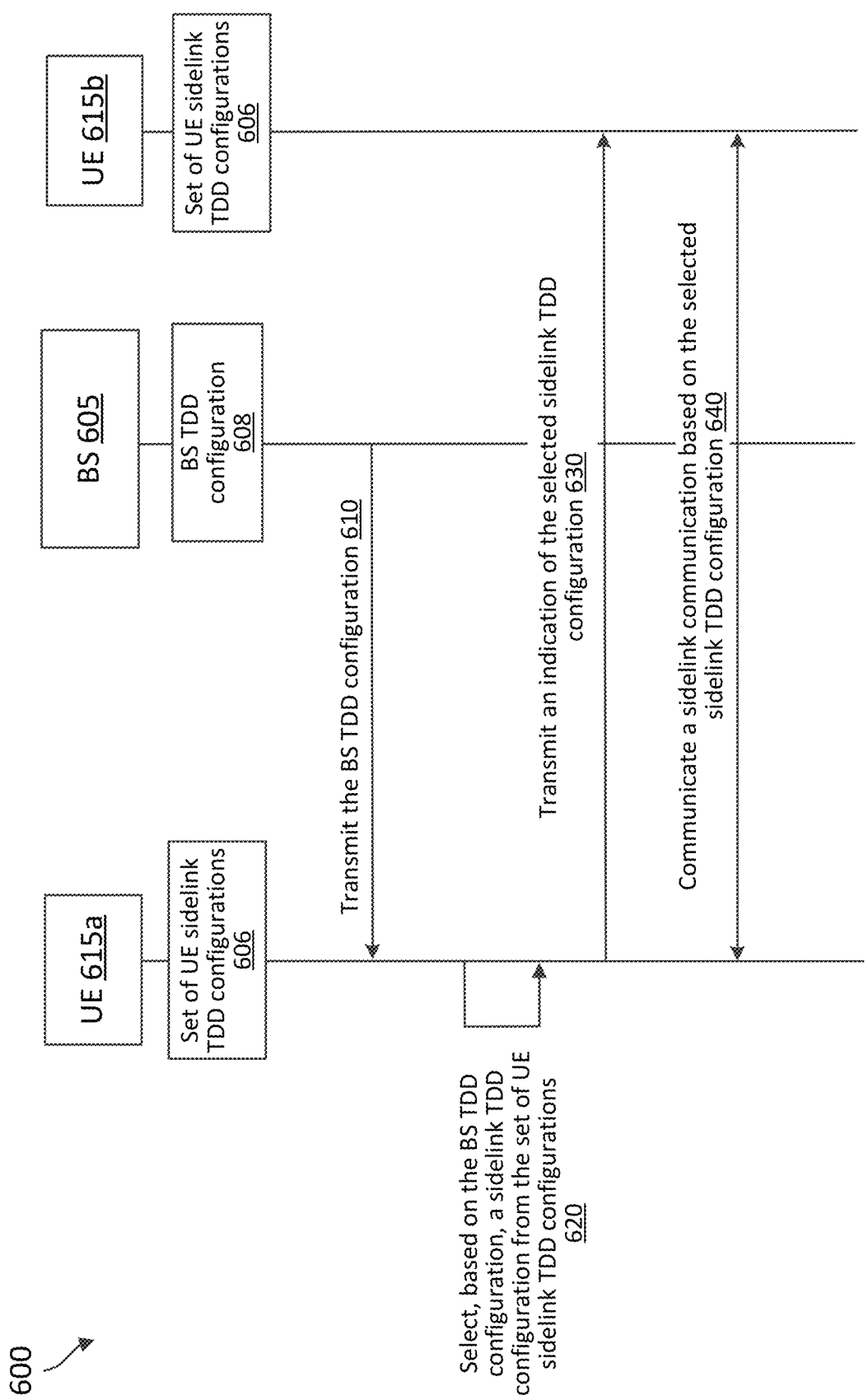
FIG. 6 is a signaling diagram of a sidelink communication method according to some aspects of the present disclosure.

FIG. 6 is a signaling diagram of a sidelink communication method 600 according to some aspects of the present disclosure. The method 600 may be implemented between a BS (e.g., BSs 105, 205, and/or 500) and two UEs (e.g., UEs 115, 215, and/or 400) shown as a UE 615a and a UE 615b. The method 600 may employ similar mechanisms as in the methods 900 and/or 1000, described above with respect to FIGS. 9 and 10, respectively. As illustrated, the method 600 includes a number of enumerated steps, but embodiments of the method 600 may include additional steps before, after, and in between the enumerated steps. In some aspects, one or more of the enumerated steps may be omitted or performed in a different order.

In some aspects, each TDD configuration in a set of preconfigured or predetermined TDD configurations is indexed into an index table. FIG. 7 is an index table 700 according to some aspects of the present disclosure. FIGS. 6 and 7 will be discussed in relation to each other to better understand some concepts of the present disclosure.

The UE 615a may be within a coverage area of the BS 605 and thus may receive communications from the BS 605. The BS 605 may transmit TDD communication signals in accordance with a BS TDD configuration 608. The BS TDD configuration 608 is a TDD configuration of the BS 605 and may include one or more TDD configurations. In an aspect, the BS TDD configuration 608 may be the TDD configuration 300 in FIG. 3. The BS TDD configuration 608 may include one or more patterns (e.g., 1 or 2).

The UE 615a and the UE 615b may have access to a set of UE sidelink TDD configurations 606. The set of UE sidelink TDD configurations 606 may include one or more TDD configurations. The UE 615a may identify the set of UE sidelink TDD configurations 606. The set of UE sidelink TDD configurations 606 may be preconfigured or predetermined. A preconfigured or predetermined TDD configuration may refer to a TDD configuration that is specified in the 3GPP specifications, that is configured at the UE as part of a set of parameters for the UE to perform sidelink communications, and/or that is configured by the BS for the UE 615a. The UE 615a may transmit TDD communication signals in accordance with one or more TDD configuration included in the set of UE sidelink TDD configurations 606. The set of UE sidelink TDD configurations 606 may include or may be devoid of the BS TDD configuration 608.

At step 610, the BS 605 transmits the BS TDD configuration 608 to the in-coverage UE 615a. In some aspects, the BS 605 may transmit a signal indicating the BS TDD configuration 608 to the UE 615a. The UE 615a receives the BS TDD configuration 608 from the BS 605

At step 620, the UE 615a selects, based on the BS TDD configuration 608, a sidelink TDD configuration from the set of UE sidelink TDD configurations 606. Each TDD configuration in the set of UE sidelink TDD configurations 606 may be stored as shown in the index table 700. The UEs 615a and 615b may transmit communications in accordance with the parameters provided in the index table 700. An example set of UE sidelink TDD configurations (e.g., set of UE sidelink TDD configurations 606) is shown in the index table 700. Each TDD configuration has a periodicity and an indication of the number of UL slots and can be identified by a table index.

As shown in FIG. 7, in the first entry of the index table 700, a TDD configuration associated with an index "0" may specify a periodicity of 2 ms and indicate 2 UL slots. In the second entry of the index table 700, a TDD configuration associated with an index "1" may specify a periodicity of 2 ms and indicate 4 UL slots. In the third entry of the index table 700, a TDD configuration associated with an index "2" may specify a periodicity of 5 ms and indicate 2 UL slots. In the fourth entry of the index table 700, a TDD configuration associated with an index "3" may specify a periodicity of 5 ms and indicate 4 UL slots. In the fifth entry of the index table 700, a TDD configuration associated with an index "4" may specify a periodicity of 5 ms and indicate 8 UL slots. In the sixth entry of the index table 700, a TDD configuration associated with an index "5" may specify a periodicity of 10 ms and indicate 2 UL slots. In the seventh entry of the index table 700, a TDD configuration associated with an index "6" may specify a periodicity of 10 ms and indicate 4 UL slots. In the eighth entry of the index table 700, a TDD configuration associated with an index "7" may specify a periodicity of 10 ms and indicate 8 UL slots. In the ninth entry of the index table 700, a TDD configuration associated with an index "8" may specify a periodicity of 10 ms and indicate 16 UL slots.

The UE 615a selects one TDD configuration from the set of UE sidelink TDD configurations shown in the index table 700 for sidelink communications, where the selected TDD configuration is based on the BS TDD configuration 608. The UE 615a may select, based on the comparison between the BS TDD configuration 608 and the set of UE sidelink TDD configurations 606, a sidelink TDD configuration in accordance with one or more rules. The UE 615a may compare the BS TDD configuration 608 and the set of UE sidelink TDD configurations 606 to identify the closest TDD configuration from the set of UE sidelink TDD configurations 606 that matches the BS TDD configuration 608.

A rule may specify that the UE 615a selects a sidelink TDD configuration from the set of UE sidelink TDD configurations 606 that has the greatest number of parameter matches or has the closest parameter matches to the BS TDD configuration 608. A parameter may be a periodicity, a SCS, a number of UL slots, a number of DL slots, a number of flexible slots, and/or a number of patterns specified by the TDD configuration. The UE 615a's use of the selected sidelink TDD configuration for sidelink communications may result in minimum interference to the BS 605. A BS TDD configuration 608 that specifies a periodicity of 10 ms and a 30 kHz SCS has 20 slots in a TDD configuration period. Additionally, a number of UL slots in the period of the TDD configuration is 9. The UE 615a may receive this BS TDD configuration 608 and select the TDD configuration associated with the index "7," which specifies a periodicity of 10 ms and 8 UL slots. The UE 615a may select the TDD configuration associated with the index "7" by determining that the TDD configurations associated with indexes "5," "6," "7," and "8" have a periodicity of 10 ms and accordingly filter out the other TDD configurations (e.g., the TDD configurations associated with indexes "0" and "1" having a periodicity of 2 ms and the TDD configurations associated with indexes "2," "3," and "4" having a periodicity of 5 ms) from consideration. From the TDD configurations associated with indexes "5," "6," "7," and "8" in the index table 700, the UE 615a may determine that the TDD configuration associated with the index "7" has 8 UL slots, the closest number of UL slots to the 9 UL slots.

In some aspects, the UE 615a may select the TDD configuration specifying a number of UL slots closest to and smaller than the number of UL slots specified in the BS TDD configuration. Accordingly, the number of UL slots in the sidelink TDD configuration selected from the set of UE sidelink TDD configurations 606 does not exceed the number of UL slots configured by the BS. In some aspects, the number of UL slots in the sidelink TDD configuration selected from the set of UE sidelink TDD configurations 606 matches a sum of the number of UL slots and the number of flexible slots specified in the BS TDD configuration.

Additionally, a set of rules may specify a priority for parameter matches (e.g., based on a weighting function). In some aspects, a rule may prioritize the parameters that match in the following order: the SCS, the number of patterns, the periodicity, the number of UL slots, the number flexible slots, and the number of DL slots. The first parameter (e.g., the SCS) listed has the highest priority, the last parameter (e.g., the number of DL slots) has the lowest priority, with each parameter have a lower priority than the preceding parameter. The UE may generate a score for each TDD configuration of the set of UE sidelink TDD configurations 606. In some aspects, the UE may apply a weighting function in which the parameters having a higher parameter are given a greater weight than parameters having a lower parameter and may select the TDD configuration associated with the highest score.

It should be understood that in other aspects, the set of rules may provide for a different order of priorities and/or the set of rules may use different parameters than that provided in the disclosure. In some aspects, the SCS may not be part of the sidelink TDD configuration. Accordingly, the parameters used in the rule may be in an order from highest priority to lowest priority as follows: the number of patterns, the periodicity, the number of UL slots, the number flexible slots, and the number of DL slots.

At step 630, the UE 615a transmits an indication of the selected sidelink TDD configuration to the UE 615b. The UE 615a may transmit an indication using a variety of mechanisms. In some aspects, the indication is an index of the TDD configuration, and the UE 615a transmits an index associated with the selected sidelink TDD configuration. In some aspects, each TDD configuration in the set of UE sidelink TDD configurations 606 has an index "3", and the UE 615a indicates the TDD configuration specifying a periodicity of 5 ms and 4 UL slots by conveying the index "3" via the sidelink broadcast channel (e.g., PSBCH).

If the BS TDD configuration 608 specifies a first BS pattern and a second BS pattern, the UE 615a may select a first sidelink TDD configuration from the set of UE sidelink TDD configurations 606 based on the first BS pattern. The first sidelink TDD configuration may specify the same parameters as those specified in the first BS pattern or may be the closest TDD configuration to the first BS pattern compared to the other sidelink TDD configurations included in the set of UE sidelink TDD configurations 608. Additionally, the UE 615a may select a second sidelink TDD configuration from the set of UE sidelink TDD configurations 606 based on the second BS pattern. The second sidelink TDD configuration may specify the same parameters as those specified in the second BS pattern or may be the closest TDD configuration to the second BS pattern compared to the other sidelink TDD configurations included in the set of UE sidelink TDD configurations 608.

Additionally, the UE 615a may transmit an indication for each pattern specified in a given TDD configuration. If the UE selects a sidelink TDD configuration having a first pattern specified by index "4" and a second pattern specified by index "6" in the index table 700, the UE 615a may transmit both "4" and "7" via the PSBCH. In some aspects, the UE may also transmit a parameter indicating number of TDD patterns via the PSBCH. In some aspects, if each TDD configuration in the set of UE sidelink TDD configurations 606 specifies a number of UL slots in a period for a TDD pattern, the UE 615a may convey the index of the selected sidelink TDD configuration periodicity via the PSBCH.

It may be unnecessary for the UE to receive a signal indicating a DL/UL TDD pattern. In some aspects, if a single TDD UL/DL configuration is preconfigured and a UE is unable to receive a BS TDD configuration from a BS (e.g., UE is out-of-coverage), the UE may assume usage of the preconfigured TDD UL/DL configuration and transmit communications in accordance with the preconfigured TDD UL/DL configuration. The preconfigured TDD UL/DL configuration may have an associated periodicity, number of UL slots, etc. In some aspects, a single UL/DL slot format is preconfigured for each TDD configuration periodicity and/or SCS. The priority may be conveyed on sidelink (e.g., in broadcast channel). Additionally, if the BS configures two TDD configuration patterns, the periodicity for both patterns may be indicated on sidelink. The number of patterns configured may also be indicated. If the UE is unable to obtain the BS's TDD configuration, the UE may detect the periodicity in broadcast channel and may assume usage of the preconfigured UL/DL slot format associated with the periodicity.

The UE 615b may receive the sidelink TDD configuration indication from the UE 615a. In some aspects, the UE 615b may detect the indication in the PSBCH and accordingly determine the sidelink resources for sidelink communications with the UE 615a. It should also be understood that the UE 615a may use other mechanisms for transmitting the indication of the selected sidelink TDD configuration to the UE 615b.

The UE 615a and the UE 615b may both have access to the index table 700. In some aspects, a UE stores the index table 700 in memory (e.g., memory 404). The UE 615a may select a TDD configuration from the plurality of TDD configurations specified in the index table 700 and may transmit the index associated with the selected TDD configuration to indicate the selection to the UE 615b. The UE 615a may select the TDD configuration associated with the index "0," and indicates the index "0" in a PSBCH. The UE 615b receives the indication from the UE 615a to determines, based on the indication, the correct sidelink TDD configuration to use for sidelink communications with the UE 615a. The UE 615b may detect the sidelink signal in the PSBCH indicating the index 0, obtain the TDD configuration based on the index 0, and use the TDD configuration corresponding to the index 0 for sidelink communications with the UE 615a.

At step 640, the UE 615a and the UE 615b may communicate a sidelink communication based on the selected sidelink TDD configuration. The UEs 615a and 615b may apply the TDD configuration signaled in the PSBCH for sidelink communications.

Figure 8:
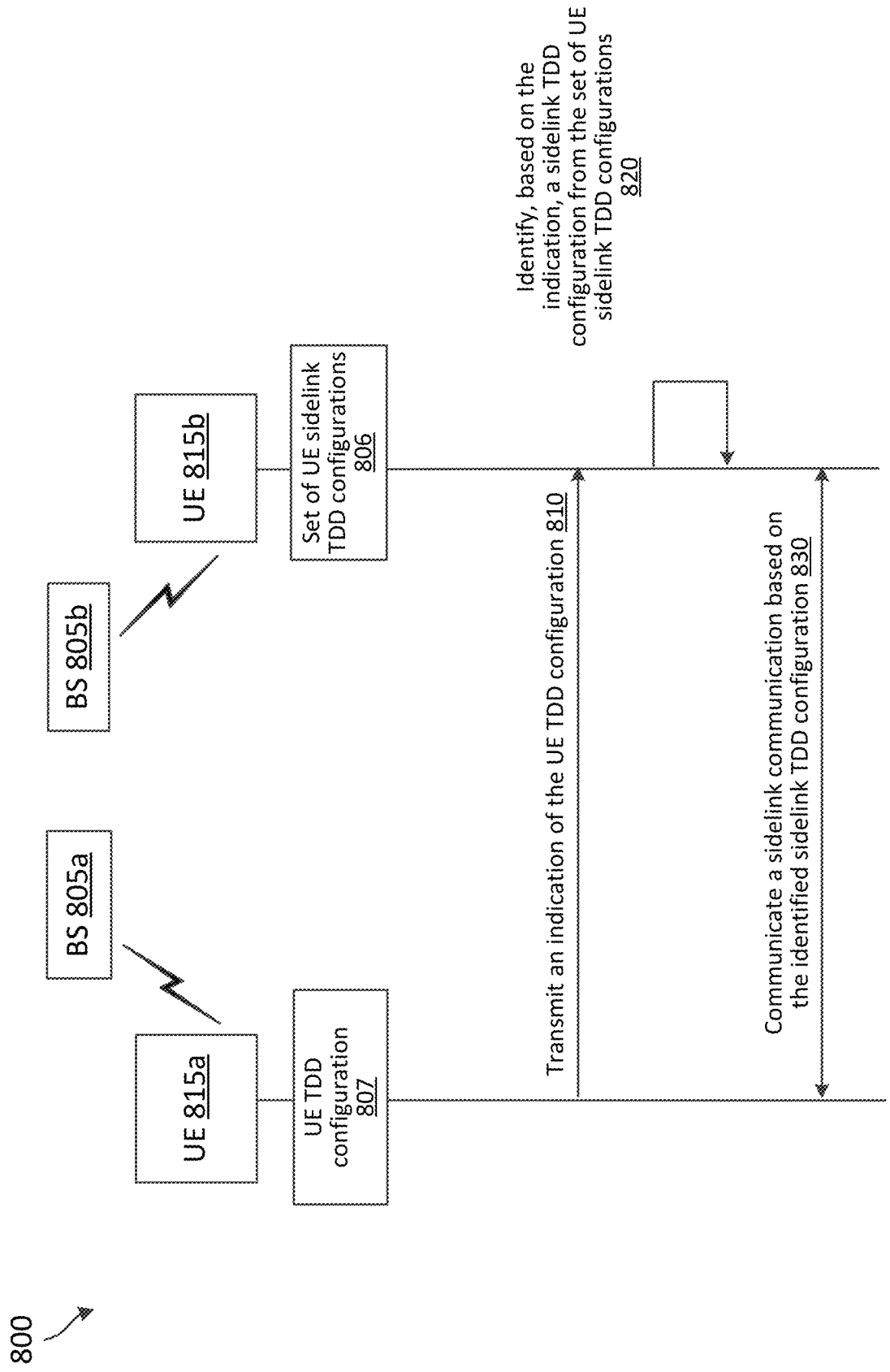
FIG. 8 is a signaling diagram of a sidelink communication method 8 according to some aspects of the present disclosure.

FIG. 8 is a signaling diagram of a sidelink communication method 800 according to some aspects of the present disclosure. The method 800 may be implemented between a BS (e.g., BSs 105, 205, and/or 500) and two UEs (e.g., UEs 115, 215, and/or 400) shown as a UE 815a and a UE 815b. The method 800 may employ similar mechanisms as in the methods 900 and/or 1000, described above with respect to FIGS. 9 and 10, respectively. As illustrated, the method 800 includes a number of enumerated steps, but embodiments of the method 800 may include additional steps before, after, and in between the enumerated steps. In some aspects, one or more of the enumerated steps may be omitted or performed in a different order.

FIGS. 7 and 8 will be discussed in relation to each other to better understand some concepts of the present disclosure. In FIG. 8, the UE 815a may be within a coverage area of the BS 805a, and the UE 815b may be within a coverage area of the BS 805b. Additionally, the UE 815a may be inside or outside the coverage area of the BS 805b, and the UE 815b may be inside or outside the coverage area of the BS 805a. If the UE 815b is outside the coverage area of the BS 805a and unable to obtain the BS 805a's TDD configuration directly from the BS 805a, the UE 815b may still be able to communicate using the sidelink with UEs that are within coverage of the 805a, as will be discussed herein. Additionally, in some aspects, if the UE 815b knows the BS 805b's TDD configuration, the UE 815b may receive data from the UE 815a, even if the BSs 805a and BS 805b have different TDD configurations.

The UEs 815a and 815b may have access to a set of UE sidelink TDD configurations 806. Each of the UE 815a and the UE 815b may transmit TDD communication signals in accordance with one or more TDD configurations included in the set of UE sidelink TDD configurations 806. The set of UE sidelink TDD configurations 806 may be preconfigured or predetermined and may include a UE TDD configuration 807. The UE 815a may transmit sidelink communications in accordance with the UE TDD configuration 807. The UE 815a may use the UE TDD configuration 807 to communicate with one or more sidelink UEs. To reduce interference, it may be desirable for the UEs 815a and 815b to communicate sidelink communications based the same sidelink TDD configuration.

At step 810, the UE 815a transmits to the UE 815b, an indication of a UE TDD configuration 807 used by the UE 815a for sidelink communications. The UE TDD configuration 807 may correspond to the sidelink TDD configuration that is selected by the UE 615a in FIG. 6 (step 620). The UE 815b receives from the UE 815a, the indication of the UE TDD configuration 807. In some aspects, the UE 815b detects sidelink signaling (e.g., PSBCH) and receives the indication of the UE TDD configuration 807 via the PSBCH.

At step 820, the UE 815b identifies, based on the indication, a sidelink TDD configuration from the set of UE sidelink TDD configurations 806. The set of UE sidelink TDD configurations 806 may include multiple TDD configurations, which may include the UE TDD configuration 807.

At step 830, the UE 815b communicates with the UE 815a, a sidelink communication based on the UE TDD configuration 807. The UE 815b applies the TDD configuration signaled in the PSBCH for sidelink communications if the UE 815b detects the indication (e.g., index into the index table 700) from the PSBCH. In some aspects, the step 830 includes receiving from the UE 815a, a sidelink communication based on the UE TDD configuration 807. In some aspects, the step 830 includes transmitting to the UE 815a, a sidelink communication based on the UE TDD configuration 807.

The index table 700 provided in FIG. 7 may provide different information than that shown in FIG. 7. In some aspects, for a TDD configuration, the third column may be labeled $n_{indicate}$ and store an index, and the number of UL slots in the TDD configuration is determined based on this index $n_{indicate}$ and SCS (numerology). The number of UL slots implied by a configuration may be $2^{(\mu-1)} n_{indicate}$, where $\mu$ is numerology (i.e., SCS) index (e.g., for 15 kHz SCS, $\mu=1$, for 30 kHz SCS, $\mu=2$, etc.).

In some aspects, it may be unnecessary for the UE 215 to receive a signal indicating the BS's TDD configuration for determining the TDD configuration to use for sidelink communications. In some aspects, the preconfigured set of UE sidelink TDD configurations includes a single TDD configuration. If the UE 215 is unable to obtain a TDD configuration of the BS from the BS 205, the UE 215 may determine to use the single TDD configuration (which has associated periodicity, number of UL slots, etc.) for sidelink communications. In some aspects, one UL/DL slot format is preconfigured for each TDD configuration periodicity and/or SCS. Accordingly, the UE may convey the periodicity and/or SCS on sidelink, e.g., in broadcast channel. If the BS 205 configures two TDD configuration patterns, the periodicity for both patterns may be indicated on sidelink (e.g., the number of patterns configured may also be indicated). If the UE 215 is unable to obtain the TDD configuration from the BS 205, the UE 215 may detect the periodicity in the broadcast channel and determine to use the preconfigured UL/DL slot format associated with the periodicity for sidelink communications.

For each periodicity of a plurality of periodicities (e.g., 0.5 ms, 0.625 ms, 1 ms, 1.25 ms, 2 ms, 2.5 ms, 5 ms, 10 ms), a pre-configured TDD configuration indicates the number of UL slots and number of DL slots for the respective periodicity. In some aspects, the BS 205 may transmit to an in-coverage UE 215a, an indication of the BS's TDD configuration, where the indication indicates the periodicity of the TDD configuration. In some aspects, the UE 215a transmits an indication of the UE 215a's TDD configuration for sidelink communications, and the indication indicates the periodicity of the UE 215a's TDD configuration. In this way, signaling overhead may be reduced by transmitting the periodicity associated with a TDD configuration rather than the entire TDD configuration.

In some aspects, only parameter is explicitly specified by a TDD configuration is the number of UL slots. In some aspects, the periodicity of a TDD configuration is conveyed on sidelink, e.g., in broadcast channel. If the BS 205 configures two TDD configuration patterns, the periodicity for both patterns may be indicated on sidelink (e.g., number of TDD patterns configured may also be indicated). In some aspects, the number of UL slots in a TDD period of a pattern is also conveyed on sidelink, e.g., in broadcast channel. In some instances, the number of UL slots in a TDD configuration period is carried by PSBCH. In some instances, an index is carried by PSBCH, and this index is mapped to the number of UL slots in a TDD configuration period (e.g., an index "0" may indicate 2 UL slots, an index "1" may indicate 4 UL slots, an index "2" may indicate 8 UL slots, and an index "3" may indicate 16 UL slots in a TDD configuration. Two bits may be used to indicate the four different numbers of UL slots (e.g., the bit value "00" may indicate 2 UL slots, the bit value "01" may indicate 4 UL slots, the bit value "10" may indicate 8 UL slots, and the bit value "11" may indicate 16 UL slots). Similarly mechanisms may have used for indicating a particular number of UL slots. For example, four bits may be used to indicate sixteen different numbers of UL slots. In this way, signaling overhead for indicating a TDD configuration may be reduced by transmitting indexes associated with TDD configurations rather than the entire TDD configurations.

Figure 9:
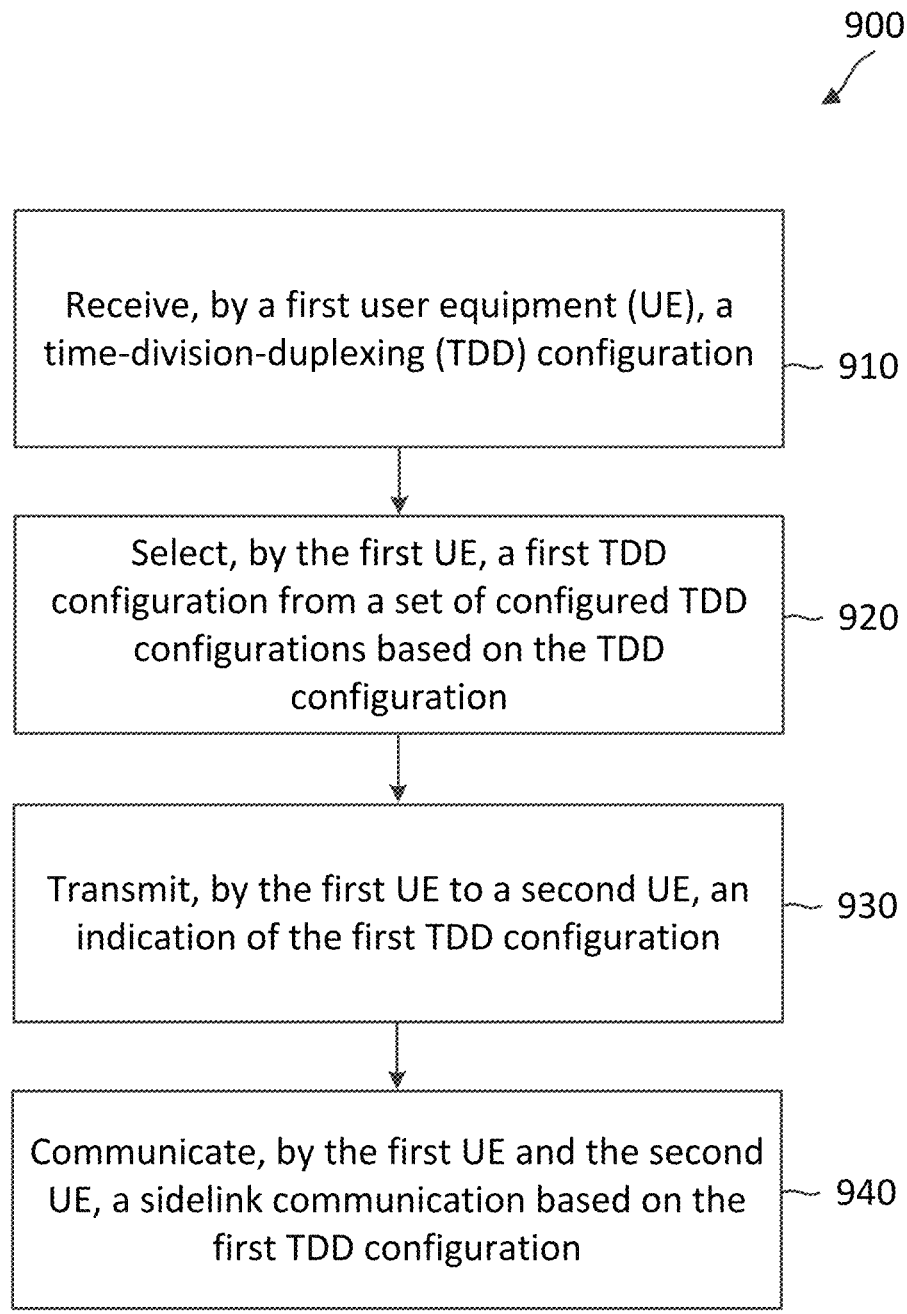
FIG. 9 is a flow diagram of a communication method according to some aspects of the present disclosure.

FIG. 9 is a flow diagram of a communication method 900 according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the UE 115, 215, or the UE 400, may utilize one or more components, such as the processor 402, the memory 404, the TDD indication module 408, the sidelink communication module 409, the transceiver 410, the modem 412, and the one or more antennas 416, to execute the steps of method 900. The method 900 may employ similar mechanisms as in the methods 600 and/or 800 described above with respect to FIGS. 6 and 8, respectively. As illustrated, the method 900 includes a number of enumerated steps, but aspects of the method 900 may include additional steps before, after, and in between the enumerated steps. In some aspects, one or more of the enumerated steps may be omitted or performed in a different order.

At step 910, the method 900 includes receiving, by a first UE, a TDD configuration. The first UE may receive the TDD configuration from a BS, another UE, a scheduling entity, and/or other wireless communication device. The TDD configuration may specify at least one of a SCS, a periodicity, or a number of TDD patterns. Additionally, a TDD pattern specified in the TDD configuration may specify at least one of a number of UL slots, a number of UL symbols, a number of DL slots, a number of DL symbols, or a number of flexible slots. The first UE may receive one or more communications from the BS in accordance with the TDD configuration.

At step 920, the method 900 includes selecting, by the first UE, a first TDD configuration from a set of configured TDD configurations based on the TDD configuration. In some aspects, the first UE determines whether the TDD configuration is included in the set of configured TDD configurations. If so, the selected first TDD configuration may be the same as the TDD configuration. In some aspects, in response to a determination that the TDD configuration is not included in the set of configured TDD configurations, the first UE may compare the TDD configuration and the set of configured TDD configurations. The first UE may select, based on the comparing, the first TDD configuration. In some aspects, the TDD configuration specifies a first set of parameters, the first TDD configuration specifies a second set of parameters, a second TDD configuration of the set of configured TDD configurations specifies a third set of parameters, and the first and second sets of parameters have a greater number of matches than the first and third sets of parameters.

At step 930, the method 900 includes transmitting, by the first UE to a second UE, an indication of the first TDD configuration. The first UE may transmit the indication by transmitting an index associated with the first TDD configuration. The first UE may transmit the indication by transmitting the indication in a sidelink broadcast channel (e.g., PSBCH). In some aspects, the first TDD configuration specifies a number of UL slots in a TDD period of a TDD pattern, and the first UE transmits the indication by transmitting the number of UL slots in PSBCH. In some aspects, the first UE identifies an index that maps to a number of UL slots, and the first TDD configuration specifies the number of UL slots in a TDD period of a TDD pattern. The first UE may transmit the indication by transmitting the index in PSBCH.

At step 940, the method 900 includes communicating, by the first UE and/or the second UE, a sidelink communication based on the first TDD configuration. The first UE and/or the second UE may transmit communication signals to and/or receive communication signals in accordance with the first TDD configuration. In some instances, at step 940, the first UE and the second UE communicate with each other. In some instances, the first UE and/or the second UE communicate with a third UE (different than the first and second UEs) in accordance with the first TDD configuration.

Figure 10:
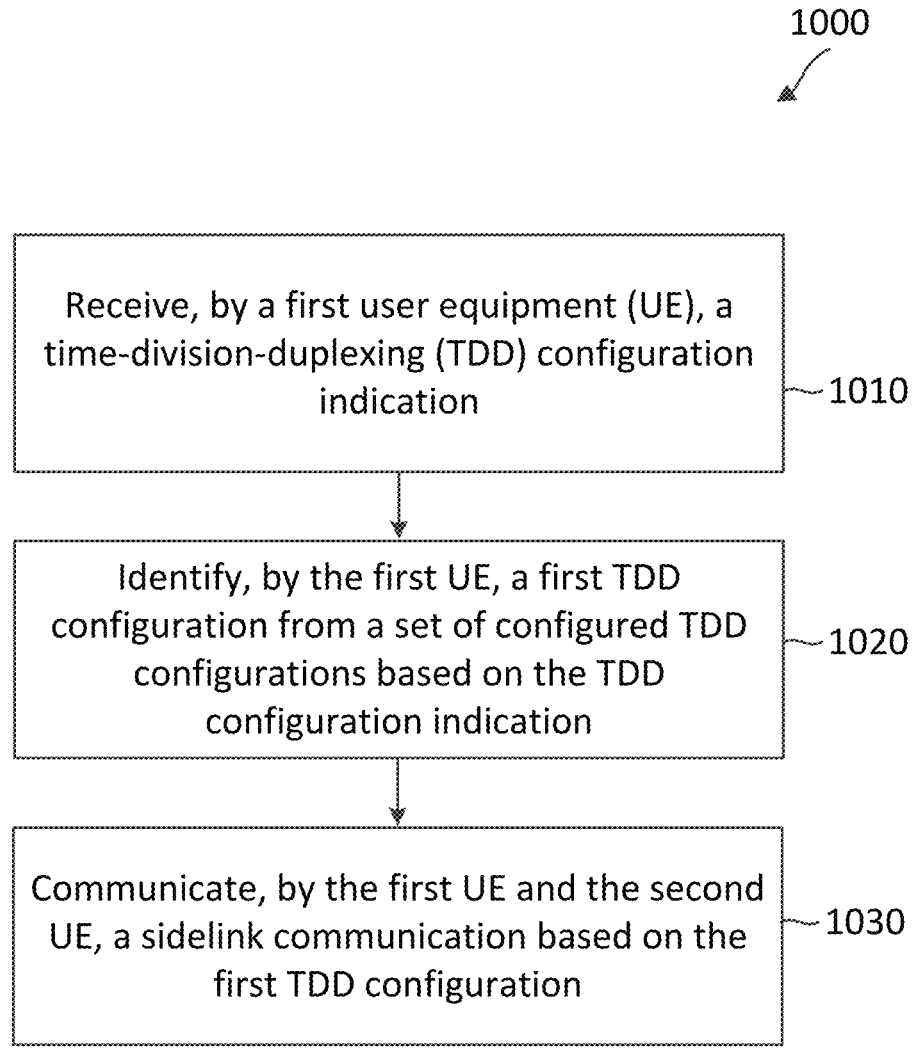
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115, 215, or the UE 400, may utilize one or more components, such as the processor 402, the memory 404, the TDD indication module 408, the sidelink communication module 409, the transceiver 410, the modem 412, and the one or more antennas 416, to execute the steps of method 1000. The method 1000 may employ similar mechanisms as in the methods 600 and/or 800 described above with respect to FIGS. 6 and 8, respectively. As illustrated, the method 1000 includes a number of enumerated steps, but aspects of the method 1000 may include additional steps before, after, and in between the enumerated steps. In some aspects, one or more of the enumerated steps may be omitted or performed in a different order.

At step 1010, the method 1000 includes receiving, by a first UE, a TDD configuration indication. The first UE may receive the TDD configuration indication from a second UE, a BS, a scheduling entity, and/or other wireless communication device. The TDD configuration indication may indicate a TDD configuration that is used by the second UE for sidelink communications. In some aspects, each of the first UE and the second UE is within a coverage area of a common BS. In some aspects, the first UE is outside a coverage area of a BS, and the second UE is within the coverage area of the BS. Accordingly, in some instances the first UE may receive the TDD configuration from the second UE when the first UE is outside a coverage area of a BS. In some aspects, the first UE is within a first coverage area of a first BS, and the second UE is within a second coverage area of a second BS, and the first and second BSs communicate in accordance with different TDD configurations. Accordingly, in some instances the first UE may receive the TDD configuration from the second UE when the first UE is within a first coverage area of a first BS and the second UE is within a second coverage area of a second BS.

At step 1020, the method 1000 includes identifying, by the first UE, a first TDD configuration from a set of sidelink TDD configurations based on the sidelink TDD configuration indication. The first UE may receive the TDD configuration indication by detecting the TDD configuration indication in a sidelink broadcast channel. The first UE may receive the TDD configuration indication by detecting an index in a sidelink broadcast channel. The index may map to the first TDD configuration of the set of configured TDD configurations. In some aspects, one UL/DL slot format is preconfigured for each TDD configuration periodicity, and the first UE receives the TDD configuration indication by detecting a periodicity of the first TDD configuration. In some aspects, one UL/DL slot format is preconfigured for each TDD configuration SCS, and the first UE receives the TDD configuration indication by detecting a SCS of the first TDD configuration in PSBCH. In some aspects, the first TDD configuration specifies a number of UL slots in a TDD period of a TDD pattern, and the first UE receives the TDD configuration indication by detecting the number of UL slots in PSBCH.

At step 1030, the method 1000 includes communicating, by the first UE, a sidelink communication based on the first TDD configuration. The first UE may transmit communication signals to and/or receive communication signals from the second UE, or a third UE (different than the second UE), in accordance with the first TDD configuration.

In some instances, a computer-readable medium having program code recorded thereon is provided. The program code can include: code for causing a first user equipment (UE) to receive from a base station (BS), a time-division-duplexing (TDD) configuration; code for causing the first UE to transmit to a second UE, an indication of a first TDD configuration; and code for causing the first UE to communicate a sidelink communication based on the first TDD configuration. In some instances, the code for causing the first UE to communicate the sidelink communication includes code for causing the first UE to communicate the sidelink communication with the second UE or code for causing the first UE to communicate the sidelink communication with a third UE, different than the second UE. In some aspects, the program code can include code for causing the first UE to select the first TDD configuration from a set of configured TDD configurations based on the TDD configuration;

In some instances, the program code can include: code for causing a first user equipment (UE) to receive from a second UE, a time-division-duplexing (TDD) configuration indication; code for causing the first UE to identify a first TDD configuration from a set of configured TDD configurations based on the TDD configuration indication; and code for causing the first UE to communicate a sidelink communication based on the first TDD configuration. In some instances, the code for causing the first UE to communicate the sidelink communication includes code for causing the first UE to communicate the sidelink communication with the second UE or code for causing the first UE to communicate the sidelink communication with a third UE, different than the second UE.

In some instances, an apparatus includes: means for receiving from a base station (BS), a time-division-duplexing (TDD) configuration; means for transmitting to a second user equipment (UE), an indication of the first TDD configuration; and means for communicating a sidelink communication based on the first TDD configuration. In some instances, the means for communicating the sidelink communication include means for communicating the sidelink communication with the second UE or means for communicating the sidelink communication with a third UE, different than the second UE. In some aspects, the apparatus includes means for selecting the first TDD configuration from a set of configured TDD configurations based on the TDD configuration.

In some instances, an apparatus includes means for receiving from a second user equipment (UE), a timedivision-duplexing (TDD) configuration indication; means for identifying a first TDD configuration from a set of configured TDD configurations based on the TDD configuration indication; and means for communicating a sidelink communication based on the first TDD configuration. In some instances, the means for communicating the sidelink communication include means for communicating the sidelink communication with the second UE or means for communicating the sidelink communication with a third UE, different than the second UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a first user equipment (UE), a time-division-duplexing (TDD) configuration;
   transmitting, by the first UE to a second UE in a physical sidelink broadcast channel (PSBCH), an indication of a first TDD configuration including a number of uplink (UL) slots in a TDD configured period of a TDD pattern or a parameter indicating the number of UL slots in the TDD configured period of the TDD pattern, wherein the first TDD configuration is different from the TDD configuration; and
   communicating, by the first UE, a sidelink communication based on the first TDD configuration.

2. The method of claim 1, wherein the TDD configuration specifies at least one of a subcarrier spacing (SCS), a periodicity, or a number of TDD patterns.

3. The method of claim 2, wherein the TDD pattern specified in the TDD configuration specifies at least one of a number of UL symbols, a number of downlink (DL) slots, a number of DL symbols, or a number of flexible slots.

4. The method of claim 1, wherein the first TDD configuration indicates a number of TDD patterns and a TDD periodicity.

5. The method of claim 4, wherein the number of TDD patterns is two and the number of UL slots includes a first number of UL slots for a first TDD pattern and a second number of UL slots for a second TDD pattern.

6. The method of claim 1, wherein transmitting the indication includes transmitting an index associated with the first TDD configuration.

7. The method of claim 1, wherein one TDD pattern is configured for each periodicity, the method comprising:
   determining, by the first UE, a first periodicity specified in the TDD configuration, the first periodicity indicating a first TDD pattern in the first TDD configuration, wherein transmitting the indication includes transmitting the first periodicity.

8. The method of claim 7, further comprising:
   determining, by the first UE, a second periodicity specified in the TDD configuration, the second periodicity indicating a second TDD pattern in the first TDD configuration, wherein transmitting the indication includes transmitting the second periodicity.

9. The method of claim 1, wherein:
   the first TDD configuration indicates the number of UL slots in the TDD period of the TDD pattern; and
   the transmitting the indication includes transmitting an index mapping to the number of UL slots in the PSBCH.

10. The method of claim 1, comprising:
    receiving, by the first UE, one or more communications from a base station (BS), wherein the TDD configuration is indicated by the one or more communications.

11. The method of claim 1, wherein the first TDD configuration indicates the TDD pattern and a second TDD pattern, and wherein transmitting the indication includes transmitting a first index and a second index in the PSBCH, the first index mapping to the TDD pattern in an index table, and the second index mapping to the second TDD pattern in the index table.

12. The method of claim 1, wherein communicating the sidelink communication includes communicating the sidelink communication in one or more UL slots indicated by the first TDD configuration.

13. A method of wireless communication, comprising:
    receiving, by a first user equipment (UE) in a physical sidelink broadcast channel (PSBCH), a time-division-duplexing (TDD) configuration indication;
    identifying, by the first UE, a first TDD configuration from a set of TDD configurations based on the TDD configuration indication, wherein the first TDD configuration indicates a number of uplink (UL) slots in a TDD configured period of a TDD pattern or a parameter indicating the number of UL slots in the TDD configured period of the TDD pattern and communicating, by the first UE, a sidelink communication based on the first TDD configuration.

14. The method of claim 13, wherein the receiving the TDD configuration comprises receiving the TDD configuration from a second UE.

15. The method of claim 14, wherein the receiving the TDD configuration comprises receiving the TDD configuration from the second UE when the first UE is outside a coverage area of a base station (BS).

16. The method of claim 14, wherein the receiving the TDD configuration comprises receiving the TDD configuration from the second UE when the first UE is within a first coverage area of a first base station (BS) and the second UE is within a second coverage area of a second BS.

17. The method of claim 13, wherein the receiving the TDD configuration indication includes detecting an index in the PSBCH, the index mapping to the first TDD configuration of the set of TDD configurations.

18. The method of claim 13, wherein one uplink/downlink (UL/DL) slot format is preconfigured for each TDD configuration periodicity, and wherein the receiving the TDD configuration indication includes detecting a periodicity of the first TDD configuration.

19. The method of claim 13, wherein one uplink/downlink (UL/DL) slot format is preconfigured for each TDD configuration subcarrier spacing (SCS), wherein the receiving the TDD configuration indication includes detecting a SCS of the first TDD configuration in the PSBCH.

20. A first user equipment (UE) comprising:
a memory;
a transceiver; and
at least one processor coupled to the memory and the transceiver, wherein the first UE is configured to:
receive a time-division-duplexing (TDD) configuration;
transmit, to a second UE in a physical sidelink broadcast channel (PSBCH), an indication of a first TDD configuration including a number of uplink (UL) slots in a TDD configured period of a TDD pattern or a parameter indicating the number of UL slots in the TDD configured period of the TDD pattern, wherein the first TDD configuration is different from the TDD configuration; and communicate a sidelink communication based on the first TDD configuration.

21. The apparatus of claim 20, wherein the first TDD configuration indicates a number of TDD patterns and a TDD periodicity.

22. The apparatus of claim 21, wherein the number of TDD patterns is two and the number of uplink slots includes a first number of uplink slots for a first TDD pattern and a second number of uplink slots for a second TDD pattern.

23. The apparatus of claim 20, wherein the transceiver is further configured to transmit an index associated with the first TDD configuration, and the index is the indication of the first TDD configuration.

24. A user equipment (UE) comprising:
a memory;
a transceiver; and
at least one processor coupled to the memory and the transceiver, wherein the UE is configured to:
receive, in a physical sidelink broadcast channel (PSBCH) a time-division-duplexing (TDD) configuration indication;
identify a first TDD configuration from a set of TDD configurations based on the TDD configuration indication, wherein the first TDD configuration indicates a number of uplink (UL) slots in a TDD configured period of a TDD pattern or a parameter indicating the number of UL slots in the TDD configured period of the TDD pattern; and communicate a sidelink communication based on the first TDD configuration.

* * * * *